Figures 1, 2:
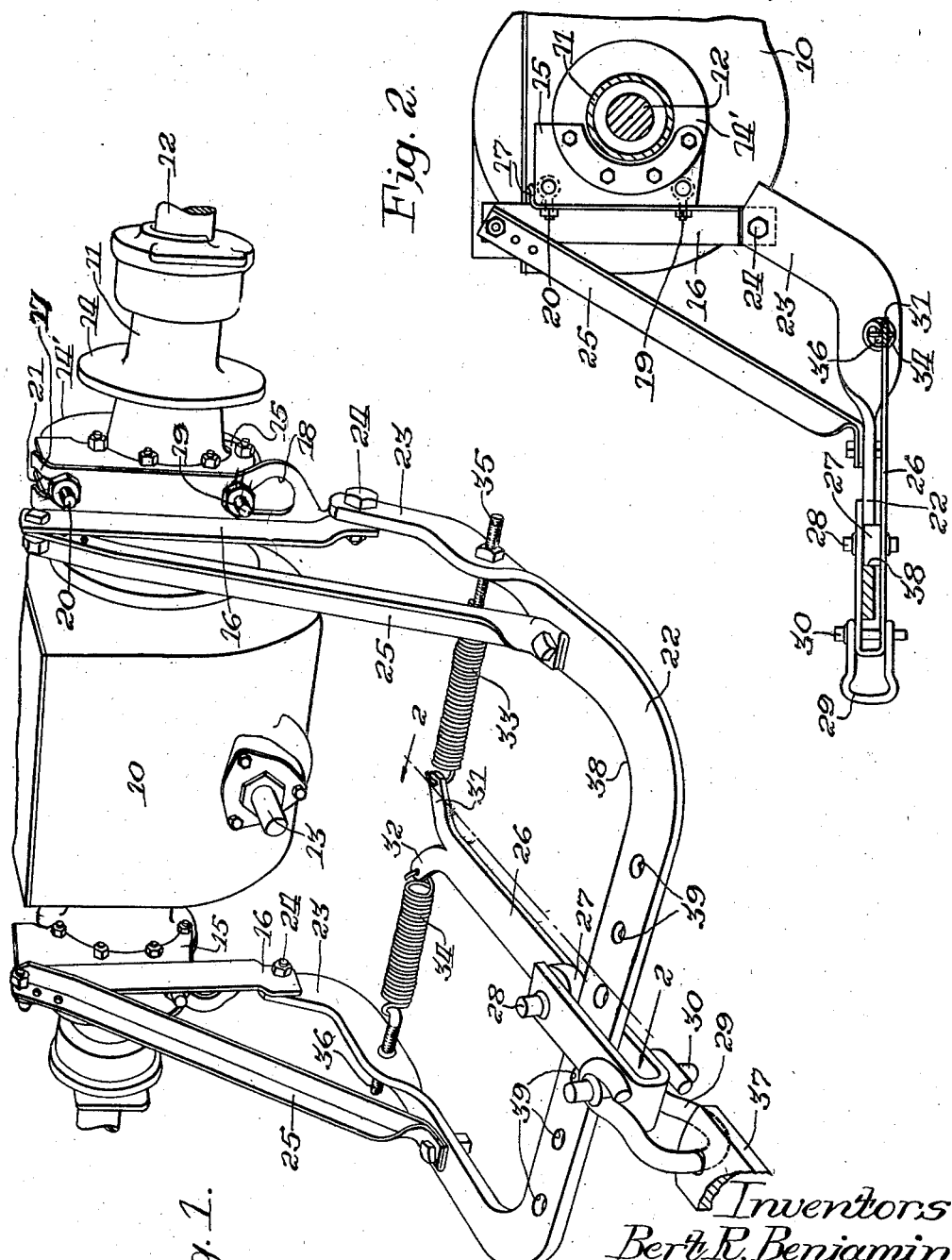

Sept. 7, 1937.  B. R. BENJAMIN ET AL  2,092,597

TRACTOR DRAW BAR

Filed Feb. 29, 1936

Inventors
Bert R. Benjamin
and Carl W. Mott
By /s/ Lamaque
Atty.

Patented Sept. 7, 1937

2,092,597

UNITED STATES PATENT OFFICE 2,092,597

TRACTOR DRAW-BAR

Bert R. Benjamin, Oak Park, and Carl W. Mott, Rock Falls, Ill., assignors to International Harvester Company, a corporation of New Jersey Application February 29, 1936, Serial No. 66,346

11 Claims. (Cl. 280—33.44)

This invention relates to means for coupling certain types of farm implements to a draft vehicle or tractor.

The principal purpose of the invention is to provide a simple form of draft coupling or hitch construction that will permit connecting a wheel supported implement with the rear of a tractor in a manner to efficiently transmit the draft and also give an arrangement having the necessary flexibility for short turns of the tractor and implement.

The main object of the invention is to provide an automatic shifting hitch in which the draft bar of the hitch attachment will return to its normal position upon the tractor being returned to its straight away position after a short turn has been made.

Another object of the invention is to provide equalizing springs for the draft connection and means for adjusting the tension of the equalizing springs.

Another object of the invention is to provide an improved means for guiding the draft connection on a draw-bar.

Another object of the invention is to provide means in the draft connection to permit a short turn to be easily made without the accompanying side draft on the tractor.

Further objects are to provide a hitch affording ample space between the tractor and the attached implement that will avoid fouling between the implement and tractor wheels on short turns and support the hitch members so that they will remain in operative position when not subject to the pull of the tractor.

Another object of the invention is to provide a draft connection in the form of a quick detachable draw-bar construction.

Minor objects will become apparent as the specific description of the construction illustrating a preferred embodiment of the invention is disclosed. Referring to the drawing:

Figure 1 is a perspective view of the draw-bar attachment in the form of a quick detachable construction attached to the rear axle housings of a tractor of the general purpose type of tractor disclosed in the patent to Haas 1,964,465 granted June 26, 1934, and having the quick detachable coupling brackets, such as is claimed in assignee's copending application of C. W. Mott, Serial No. 29,938, allowed February 12, 1936; and, Figure 2 is a sectional view taken along the line 2—2 of Figure 1, looking in the direction of the arrows.

The rear portion of the tractor or draft vehicle illustrated is of the general purpose type disclosed in the aforementioned patent to Haas having laterally extending rear axle housings 11 and axles 12 extending laterally from the axle housings 11. The rear axle housings 11 are secured to the narrow body portion 10 which has the usual power take-off shaft 13 extending rearwardly therefrom. The rear axle housings 11 have laterally positioned thereon integral flange members 14 and 14' being respectively the outer and inner flange portions. Attached to the inner flange portions 14' are the coupling plates in the form of horse-shoe coupling members 15. Attached to the inner coupling members 15 are laterally spaced supporting brackets 16.

The supporting brackets 16 are in the nature of quick detachable supports which are readily attached to the coupling members 15. The coupling brackets 16 have forwardly extending supports 17 at their upper ends which act to support the brackets 16 on the coupling prior to the brackets being secured thereto. At the lower ends of the supporting brackets 16 are the enlarged holes 18 through which the swivel bolts 19 are swung upwardly and secured in place. The upper swivel bolts 20 are swung downwardly through the slotted portion 21 of the forwardly extending support of the supporting member 16. It is, therefore, obvious that the supporting brackets 16 with whatever attachments are mounted thereon may be readily connected to and disconnected from the tractor.

Connected to the lower ends of the supporting brackets 16 is the U-shaped draw-bar or member 22. The U-shaped draw-bar 22 has a transverse portion which is flat in a horizontal position and which is so placed that the width of the bar extends to the front and rear of the tractor to give rigidity to the draw-bar. The leg portions of the draw-bar 22 extend forwardly and are given a quarter turn to give rigidity and strength at their forward ends. The front portions 23 of the draw-bar 22 are pivotally connected at 24 to the downwardly extending supports 16. The draw-bar 22 is held in horizontal adjusted position by the angle iron braces 25 secured at their rear ends to the draw-bar 22 and at their upper ends to the upper ends of supporting brackets 16.

Attached to the horizontal draw-bar 22 is a longitudinal freely floating draft bar or draft link 26 comprising draw-bar means slidably mounted intermediate its ends and adapted to have freely floating movement with respect thereto. The draft link 26 is free to move horizontally laterally on the flat horizontal portion of the draw-bar 22 about a radius of infinite length. The rear end of the draft link is bent upon itself and spaced to receive the draw-bar 22. At the inner end of the bent portion of the draw-bar 26 is journaled a roller 27 on the draft pin 28. The roller 27 permits a free lateral movement and swinging movement of the draft link on the inner side of the draw-bar 22. The movement of the draft link is defined as freely floating because it does not have a fixed pivot at its extremities with respect to the tractor. At the rear end of the draft link 26 is a clevis 29 which is secured to the draft link 26 by the draft pin 30 which passes through the loops of the clevis 29 and through the loop portion of the draft link 26.

The draft link 26 is forked at its forward end as at 31 and 32. Connected to the forked ends 31 and 32 are laterally extending springs 33 and 34. The springs 33 and 34 are connected to eye bolts 35 and 36 which are secured to the parallel arms of the draw-bar 22. It is, therefore, seen that a compensating or equalizing mechanism has been provided for the draft link which will cause the draft link to return to its center position after the tractor has made a short turn either to the right or the left when the draft link 26 is connected to the draft connection 37 of any tractor drawn implement or drawn vehicle.

In the operation of this tractor draft connection, when it is connected to a trailing implement, the tractor turns either to the right or the left, the implement which is attached tends to remain stationary, while the draw-bar 22, as it is attached to the tractor, is free to swing relative to the implement. As the draft link 26 has the roller 27 mounted thereon, this lateral relative movement is accomplished with very little friction, as is not usually the case with the usual draft connection. As the tractor is swung to the right or left depending on the turn being made, the draft link 26 moves relative to the draw-bar so that in its final short turn position, the draft link is contacting the curved portion 38 connecting the transverse portion of the draw-bar to the leg portions. When the draft link 26 is in this position the springs 33 and 34 are put under tension. In turning the tractor back to its straight away position, the springs 33 and 34, as they are under tension, aid this turning and also bring the draft link 26 back to normal straight away position. With this compensating connection between the draft link and the draw-bar the tractor is readily steered either to the right or left in making a short turn and also upon the return of the tractor to its straight away position. This has been accomplished by reducing the friction which is usual between a tractor attached implement connected to the draw-bar by the usual draft pin by the roller engaging the draw-bar and with the compensating or equalizing means. This friction has been reduced and a greatly improved draw-bar construction has been made. It is to be understood that implements may be connected to the draw-bar 22 in the usual manner by means of the clevis 29 and draft pin 30 being attached by the holes 39 in the horizontal portion of the draw-bar 22.

The draw-bar attachment has been so designed as to be removable as a complete unit so that other tools may be readily attached. These tools are known as quick detachable tools. The complete draw-bar assembly may be readily removed by unfastening the bolts 19 and 20 and swinging them through their respective attaching portions. The draw-bar attachment is such that it may be readily attached by one person. It is also to be understood that the draft link with its compensating connections may also be readily removed and other draft links attached in its place.

The novel structure described is capable of certain modifications without departing from the scope of the invention as disclosed in the following claims.

What is claimed is:

1. A draft device comprising the combination with a tractor, of a substantially horizontally positioned arched member comprising a transverse portion having parallel arms connected to the tractor, supporting links connecting the arched member with the tractor at a desired elevation, a longitudinally extending freely floating draft link supported intermediate its ends on said arched member for lateral movement, and compensating means for the draft link located between the arms of said arched member.

2. A draft device comprising the combination with a tractor, of an arched member comprising a transverse portion having parallel arms connected to the tractor for vertical movement, a longitudinally extending freely floating draft link supported intermediate its ends on said arched member for lateral movement, and compensating means for the draft link connected to the draft link and to the arms of the arched member.

3. A draft device comprising the combination with a tractor, of a substantially horizontally positioned arched member comprising a transverse portion having parallel arms connected to the tractor, a longitudinally extending freely floating draft link supported on said arched member for lateral movement, laterally extending connections on said draft link, and compensating means for said draft link connected to the laterally extending connections on said draft link.

4. A draft device comprising the combination with a tractor, of a horizontally positioned arched member comprising a transverse portion having parallel arms connected to the tractor, a longitudinally extending freely floating draft link supported intermediate its ends on said arched member for lateral movement, and resilient means for compensating the draft link connected to the draft link and to the arms of the arched member.

5. A draft device comprising the combination with a tractor, of a horizontally positioned arched member comprising a transverse portion having parallel arms connected to the tractor, a longitudinally extending freely floating draft link supported intermediate its ends on said arched member for lateral movement, a roller mounted on said draft link and adapted to engage said arched member during the lateral movement of said draft link, and compensating means for the draft link located between the arms of said arched member.

6. A draft device comprising the combination with a tractor, of a horizontally positioned arched member connected to the tractor, a longitudinally extending freely floating draft link supported intermediate its ends on said arched member for lateral movement, a roller mounted intermediate its ends and adapted to contact the inner edge of the arched member during the lateral movement of said draft link, and resilient means for compensating the draft link connected to the draft link and the arched member.

7. A draft device comprising the combination with a tractor, of a horizontally positioned arched member connected to the tractor, a longitudinally extending freely floating draft link, means on said draft link for supporting said draft link on said arched member, and a roller engaging said arched member mounted in said supporting means, and resilient means for compensating the draft link connected to the draft link and to the arched member.

8. A draft device comprising the combination with a tractor, of a horizontally positioned arched member comprising a transverse portion having parallel arms connected to the tractor, a longitudinally extending draft link, means on said draft link for supporting said draft link on said arched member, a roller engaging said transverse portion of said arched member and mounted in said supporting means, said draft link being forked at its front end, and a plurality of laterally spaced resilient members secured to the forked ends of the draft link and to the parallel arms of the arched member.

9. A draft device comprising the combination with a tractor and a tractor attached implement; of a longitudinally extending freely floating draft link, said draft link being mounted on the tractor and attached to the implement and adapted to swing laterally in either direction upon the making of a short turn of the tractor about a radius of infinite length; and compensating means associated with the draft link for returning the draft link to its normal position upon the completion of a short turn of the tractor.

10. A draft device comprising the combination with a tractor and a tractor attached implement; of a longitudinally extending freely floating draft link, said draft link being mounted on the tractor and attached to the implement and adapted to swing laterally in either direction upon the making of a short turn of the tractor about a radius of infinite length; means on the tractor for supporting and guiding said draft link; and resilient means connected to the draft link for returning the draft link to its normal position upon the completion of a short turn of the tractor.

11. A hitch device for use between a draft and a drawn vehicle including a rearwardly extended substantially U-shaped member secured to said draft vehicle, draw-bar means having an intermediate portion slidably mounted on the aforesaid U-shaped member and adapted to have freely floating movement with respect thereto, and means operatively associated with an end of said draw-bar means to restrain such movement.

BERT R. BENJAMIN.
CARL W. MOTT.